(12) United States Patent
Shi et al.

(10) Patent No.: US 8,781,007 B2
(45) Date of Patent: Jul. 15, 2014

(54) QUANTIZATION METHOD FOR OFDM

(75) Inventors: Wei Shi, Cambridge (GB); Andrei Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 55 days.

(21) Appl. No.: 13/580,371

(22) PCT Filed: Nov. 9, 2010

(86) PCT No.: PCT/GB2010/051859
§ 371 (c)(1),
(2), (4) Date: Aug. 21, 2012

(87) PCT Pub. No.: WO2011/104493
PCT Pub. Date: Sep. 1, 2011

(65) Prior Publication Data
US 2012/0314788 A1    Dec. 13, 2012

(30) Foreign Application Priority Data

Feb. 23, 2010  (GB) .................................. 1003011.2

(51) Int. Cl.
*H04K 1/10* (2006.01)
(52) U.S. Cl.
USPC ........... 375/260; 375/262; 375/267; 375/295; 375/316; 375/347
(58) Field of Classification Search
CPC .. H04B 7/0417; H04B 7/0634; H04B 7/0639; H04B 7/066; H04B 7/0663; H04B 7/0686; H04B 1/1036; H04B 1/109; H04B 1/16; H04L 27/2602; H04L 5/023; H04L 27/2626; H04L 1/08; H03M 1/1235; H03M 1/664

USPC ......... 375/260, 262, 264, 267, 271, 295, 298, 375/299, 302, 308, 316, 319, 320, 322, 334, 375/340, 342, 346, 347, 350
See application file for complete search history.

(56) References Cited

U.S. PATENT DOCUMENTS 7,432,838 B2 * 10/2008 Muck et al. .................... 341/138
7,961,802 B2 * 6/2011 Li et al. .......................... 375/260
(Continued)

FOREIGN PATENT DOCUMENTS

GB          2423898 A     9/2006
WO     2004/098063 A1    11/2004

OTHER PUBLICATIONS

International Search Report mailed Feb. 1, 2011 for PCT Application No. PCT/GB2010/051859.

(Continued)

*Primary Examiner* — Hirdepal Singh
(74) *Attorney, Agent, or Firm* — John W. Branch; Lowe Graham Jones PLLC (57) ABSTRACT

A quantization method for OFDM is described. In an embodiment, the method uses an objective function which is defined as a function of the quantization error of the OFDM signal in frequency summed over data subcarriers. A search algorithm is used to optimize the objective function and the solution found is quantized by rounding. The quantized value of the solution may then be fed back into the objective function to compute a value of that function and if the value is less than the value computed in a previous iteration of the method, the method is repeated using the quantized value of the solution as the new starting point for the search algorithm. If the value of the function is, however, not less than the value computed in a previous iteration, the new solution is discarded and the quantized value of the solution from the previous iteration is output.

20 Claims, 5 Drawing Sheets

(56) References Cited

U.S. PATENT DOCUMENTS

| | | | |
|---|---|---|---|
| 8,462,646 B2* | 6/2013 | Barberis et al. | 370/252 |
| 8,559,481 B2* | 10/2013 | Sapozhnykov et al. | 375/146 |
| 2005/0243938 A1* | 11/2005 | Armstrong et al. | 375/260 |
| 2007/0171994 A1* | 7/2007 | Parker et al. | 375/260 |
| 2010/0007543 A1* | 1/2010 | Mueck | 341/200 |
| 2011/0058626 A1* | 3/2011 | Balakrishnan et al. | 375/296 |
| 2011/0188616 A1* | 8/2011 | Kobayashi et al. | 375/345 |
| 2011/0200139 A1* | 8/2011 | Jen et al. | 375/296 |

OTHER PUBLICATIONS

International Preliminary Report on Patentability mailed Sep. 7, 2012 for International Application No. PCT/GB2010/051859.

* cited by examiner

QUANTIZATION METHOD FOR OFDM

CROSS-REFERENCE TO RELATED APPLICATIONS

This patent application is a U.S. national phase application of International Patent Application No. PCT/GB2010/051859 filed on Nov. 9, 2010, and claims priority to U.K. Patent Application No. 1003011.2 filed on Feb. 23, 2010, both of which are incorporated herein by reference.

BACKGROUND

Systems which comply with the IEEE 802.11 standard are commonly referred to as WiFi systems. Many such systems use OFDM (orthogonal frequency division multiplexing) for modulation which divides a frequency band into a number of equally spaced frequency subcarriers (or tones) and data is then modulated onto these subcarriers. The IEEE802.11n standard defines 52 or 56 subcarriers for 20 MHz bands to carry data. Some of these subcarriers (e.g. 4 subcarriers) are not used to carry payload data but instead are used for pilot signals which improve the ability of the coherent detection at a receiver to accommodate frequency offsets and phase noise.

The frame format defined in the IEEE 802.11n standard includes a preamble which comprises short training sequences and long training sequences (or long training fields). The short training sequence is used for AGC (automatic gain control), diversity selection, timing acquisition and coarse frequency acquisition in the receiver. The long training field is used for channel estimation and fine frequency acquisition in the receiver. As these parameters are used to demodulate an OFDM packet, the quality of these initial estimates affects the transmitter modulation accuracy.

A source of errors in such systems, which can impact transmitter modulation accuracy, is quantization. In OFDM, data is modulated onto frequency tones using an IFFT (inverse fast Fourier transform) and the output from the IFFT contains real numbers, i.e. infinite decimal representation. Digital implementations of OFDM output signals using a fixed number of bits i.e. the signals are quantized. The quantized signal is then converted to an analogue signal using a digital to analogue converter. The quantization error which is introduced is the difference between the quantized value and the real number value output from the IFFT. Typically quantization is performed by rounding. There are a number of techniques which can be used to reduce quantization error, such as increasing the number of bits used for quantization or increasing the size of the IFFT (known as oversampling); however these techniques increase the overall cost and complexity of the system.

The embodiments described below are not limited to implementations which solve any or all of the disadvantages of known quantization methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An improved quantization method for OFDM is described. In an embodiment, the method uses an objective function which is defined as a function of the quantization error of the OFDM signal in frequency summed over data subcarriers. A search algorithm is used to optimize the objective function and the solution found is quantized by rounding. The quantized value of the solution may then be fed back into the objective function to compute a value of that function and if the value is less than the value computed in a previous iteration of the method, the method is repeated using the quantized value of the solution as the new starting point for the search algorithm. If the value of the function is, however, not less than the value computed in a previous iteration, the new solution is discarded and the quantized value of the solution from the previous iteration is output.

A first aspect provides a computer implemented method of quantizing an OFDM signal, the method comprising: defining an objective function as a function of a quantization error of the OFDM signal in frequency summed over data subcarriers; optimizing the objective function using a search algorithm to generate a real number solution; and rounding the real number solution to generate a quantized solution.

The method may further comprise storing the quantized solution in a look-up table in an OFDM transmitter.

The method may further comprise transmitting the quantized solution from the OFDM transmitter.

The OFDM signal may comprise long training fields.

The method may further comprise: computing a value of the objective function using the quantized solution; and for a first iteration and in subsequent iterations if the computed value is less than a value of the objective function computed in a previous iteration, repeating the method using the quantized solution as a starting point for optimizing the objective function.

The method may further comprise, in subsequent iterations if the computed value is not less than the value of the objective function computed in the previous iteration: using the quantized solution from the previous iteration.

The data subcarriers comprise payload data subcarriers and pilot subcarriers.

The objective function may be defined as a square of quantization error in frequency summed over data subcarriers. In an example, the objective function is:

$$F(x_Q(n)) = \sum_k |d_Q(k) - d(k)|^2$$

where k is over the data subcarriers, n is the time index, $d(k) = FFT(x(n))$, $x_Q(n)$ is a quantized representation of the time-domain signal $x(n)$ and $d_Q(k) = FFT(x_Q(n))$.

The search algorithm may comprise a non-linear least squares optimization algorithm.

A second aspect provides an OFDM transmitter comprising a look-up table storing quantized long training field data (e.g. $x_Q(n)$), the quantized long training field data having been generated using a method described above.

A third aspect provides a method of quantizing an OFDM long training field comprising: defining an objective function as a square of quantization error in frequency summed over data subcarriers; generating a starting search point; using a search algorithm and the starting search point to optimize the objective function and compute a solution; quantizing the solution and using the quantized solution to compute a value of the objective function; in a first iteration, storing the computed value and the quantized solution and repeating the optimization and quantization using the stored solution; and in a subsequent iteration, comparing the computed value to the stored value, and if the computed value is less than the stored value, storing the computed value and the quantized solution and repeating the optimization and quantization using the stored solution, and if the computed value is not less than the stored value, outputting the stored solution.

The method may further comprise repeating the method for each symbol in the OFDM long training field.

The method may further comprise storing the output solutions in a look-up table in an OFDM transmitter module.

The objective function may be defined as a square of quantization error in frequency summed over data subcarriers. In an example, the objective function is:

$$F(x_Q(n)) = \sum_k |d_Q(k) - d(k)|^2$$

where k is over the data subcarriers, n is the time index, $d(k)=FFT(x(n))$, $x_Q(n)$ is a quantized representation of the time-domain signal $x(n)$ and $d_Q(k)=FFT(x_Q(n))$.

A fourth aspect provides an apparatus for quantizing an OFDM signal, the apparatus comprising: an input for receiving an OFDM signal; a processor; an output for outputting a quantized OFDM signal; and a memory arranged to store executable instructions which when executed cause the processor to: optimize an objective function using a search algorithm to generate a real number solution, the objective function comprising a square of quantization error of the OFDM signal in frequency summed over data subcarriers; round the real number solution to generate a quantized solution; and store the quantized solution.

The memory may be further arranged to store executable instructions which when executed cause the processor to: compute a value of the objective function using the quantized solution; and repeat the method using the quantized solution as a starting point for optimizing the objective function if the computed value is less than a value of the objective function computed in a previous iteration.

The memory may be further arranged to store executable instructions which when executed cause the processor to: discard the quantized solution if the computed value is not less than the value of the objective function computed in the previous iteration; and output the quantized solution from the previous iteration.

The objective function is:

$$F(x_Q(n)) = \sum_k |d_Q(k) - d(k)|^2$$

where k is over the data subcarriers, n is the time index, $d(k)=FFT(x(n))$, $x_Q(n)$ is a quantized representation of the time-domain signal $x(n)$ and $d_Q(k)=FFT(x_Q(n))$.

The OFDM signal may comprise long training fields.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In OFDM, data is modulated on to frequency tones or subcarriers using the IFFT (inverse fast Fourier transform):

$$x(n) = \frac{1}{N}\sum_k d(k) \cdot \exp\left(\frac{j2\pi}{N}kn\right) \quad (1)$$

$$n = 0, 1, 2, \ldots, N-1$$

$$k = 0, 1, 2, \ldots, N-1$$

Where:
  x(n) is the time-domain signal, n is the time index
  d(k) is the data carried on frequency tone k; and
  N is the total number of frequency tones available in a frequency band.

The output from the IFFT, x(n) is generally a real number. A digital implementation of OFDM, however, outputs signals using a fixed number of bits, i.e. signals are quantized. The error signal e(n) in the time domain may be defined to be the difference between x(n) and its quantized representation $x_Q(n)$:

$$e(n)=x_Q(n)-x(n) \quad (2)$$

OFDM uses an FFT (fast Fourier transform) to extract the original data information d(k) from x(n):

$$d(k) = \sum_n x(n) \cdot \exp\left(\frac{-j2\pi}{N}kn\right) \quad (3)$$

The OFDM time-domain signal output from a digital system is quantized $x_Q(n)$ and let $d_Q(k)=FFT(x_Q(n))$.

Figure 1:
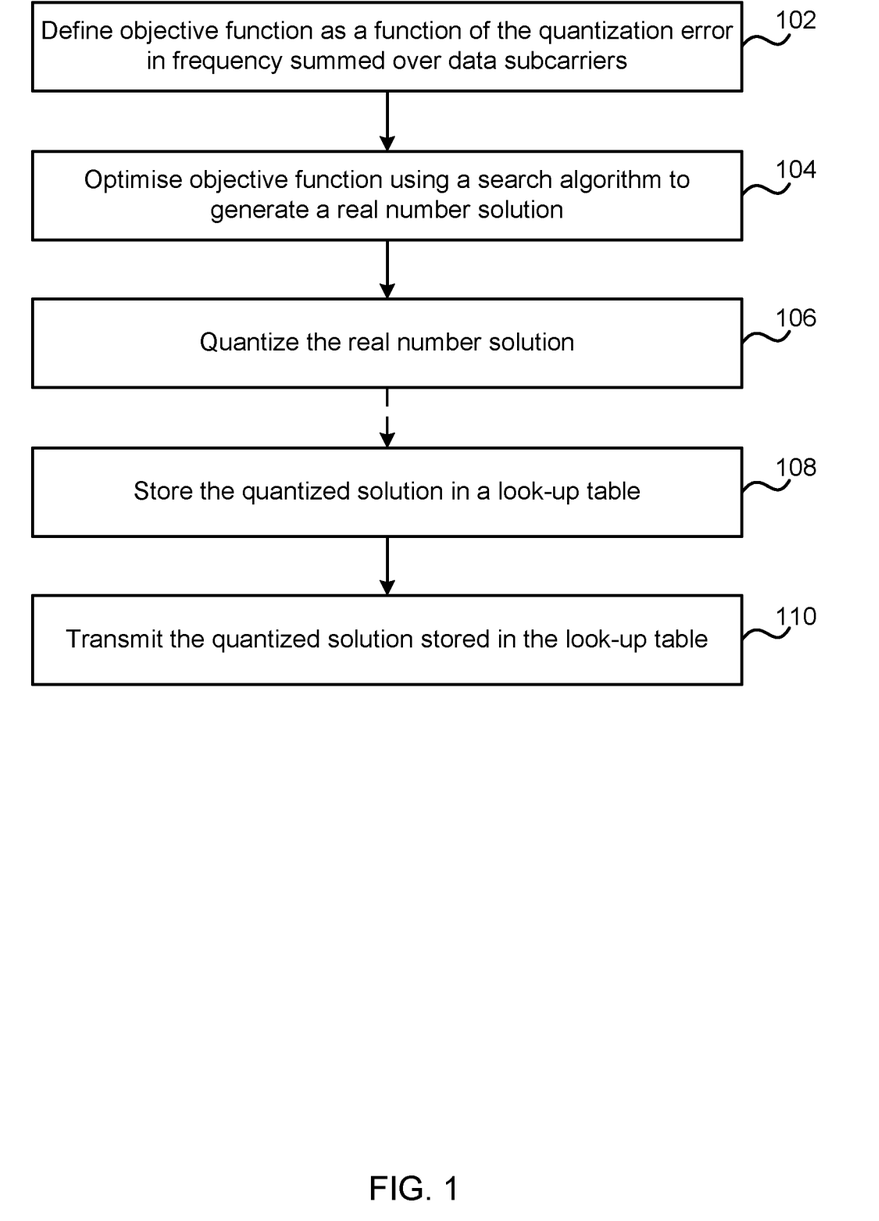
FIGS. 1 and 2 are flow diagrams of improved methods of quantization which may be used with OFDM signals.

FIG. 1 is a flow diagram of an improved method of quantization which may be used with OFDM signals and may be performed on a symbol-by-symbol basis. The method comprises defining an objective function ($F(x_Q(n))$) as a function of the quantization error in frequency ($v(k)$) summed over only data subcarriers (block 102), optimizing the objective function using a search algorithm to generate a real number solution (block 104) and quantizing the real number solution (block 106). The quantization of the real number solution (in block 106) may be performed by rounding. The term data subcarriers' refers to both payload data subcarriers and pilot subcarriers. The method may further comprise storing the quantized solution (as generated in block 106) in a look-up table (block 108) and then subsequently transmitting the quantized solution (block 110).

The quantization error in frequency may be defined as:

$$v(k) = d_Q(k) - d(k) \qquad (4)$$

And the objective function may be defined (in block 102) as:

$$F(x_Q(n)) = \sum_k |d_Q(k) - d(k)|^2 \qquad (5)$$

k is over the data subcarriers only, n=0, 1, ..., N−1

Where $x_Q(n)$ is quantized and, where appropriate, meets the spectrum mask defined in the relevant standard.

By minimizing the quantization error in the frequency domain (in blocks 102 and 104), the method exploits the fact that there are unused subcarriers in the frequency band. As described above, the IEEE 802.11n standard for an OFDM system defines 52 or 56 subcarriers to carry data for 20 MHz band operation; however, in 20 MHz mode there are 64 frequency subcarriers available within the 20 MHz bandwidth and no data is sent on the unused subcarriers. The method shown in FIG. 1 minimizes the quantization error for data subcarriers and "pushes" quantization error into the unused subcarriers.

Figure 2:
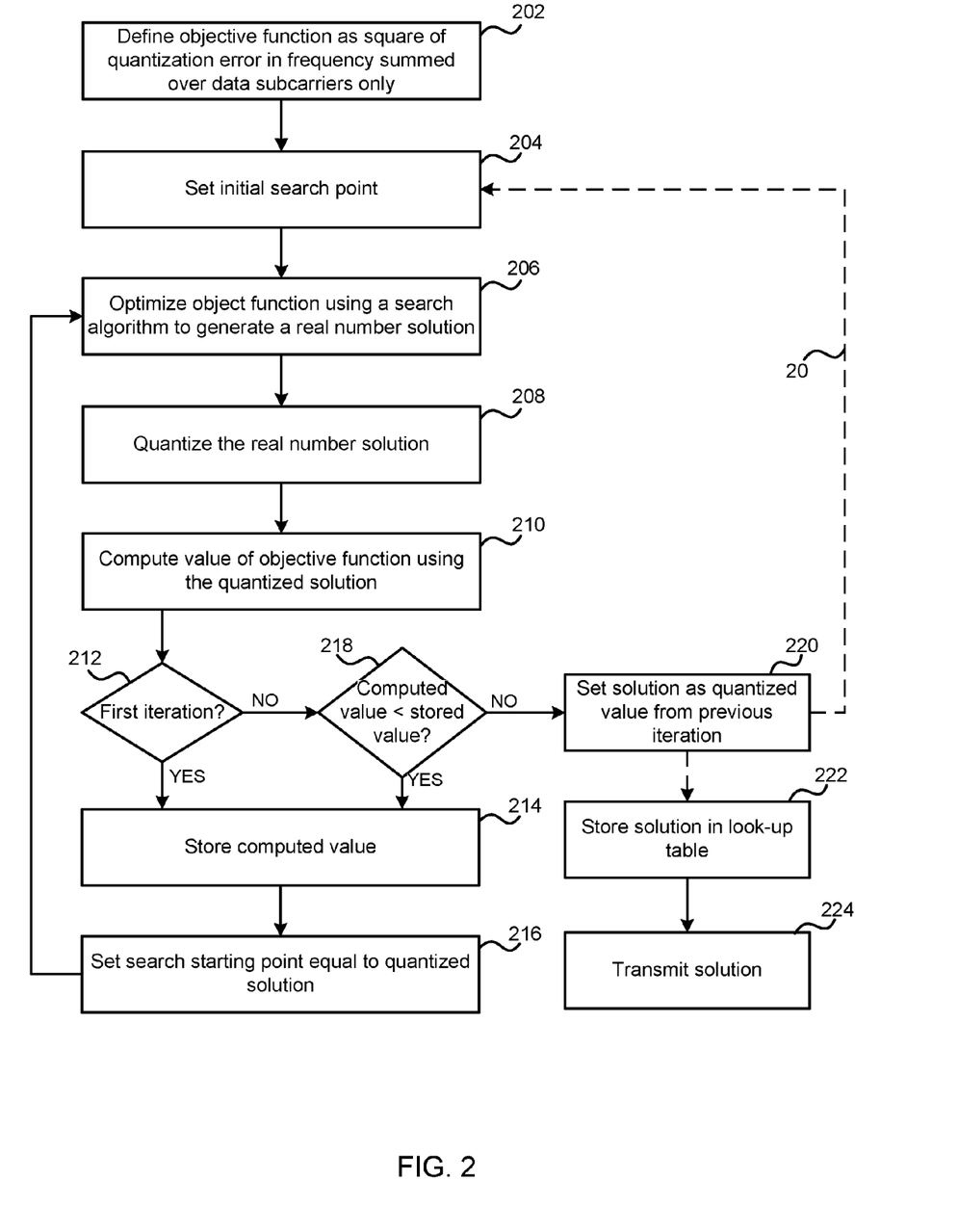

FIG. 2 is a flow diagram of another improved method of quantization which may be used with OFDM signals and may be performed on a symbol-by-symbol basis. This method uses an iterative process to reach a solution and enables the use of a search algorithm such as a non-linear least squares optimization function (e.g. Isqnonlin( ) in MATLAB (trade mark)) which performs optimization on real number variables.

The method comprises defining an objective function ($F(x_Q(n))$) as a function of the quantization error in frequency ($v(k)$) summed over data subcarriers only (block 202), as described above with reference to FIG. 1. The objective function may be as given in equation 5 above. An initial search point is set (block 204) and in an example this may be set to:

$$y^0(n) = x(n) + w(n), n=0,1,2,\ldots,N-1$$

where w(n) is a random, uniformly distributed real number, for example, with numbers in the range [−2, 2]. The search algorithm (e.g. Isqnonlin( ) is then used to optimize the objective function and generates a solution (block 206). Once a solution, $y^i(n)$ (where i is the iteration number) is found by the search algorithm (in block 206), it is quantized using rounding to give: $y^i_Q(n)$ (block 208) and the value of the objective function $F(y^i_Q(n))$ is computed (block 210).

In the first iteration (i=1, 'Yes' in block 212), there is no previous value of the objective function with which to form a comparison and so the computed value (from block 210) is stored and the quantized solution (from block 208) is used as the starting point (as set in block 216) for a subsequent iteration (blocks 206-210).

In subsequent iterations (i>1, No in block 212), the newly computed value of the objective function $F(y^i_Q(n))$ is compared with value computed in the previous iteration (block 218). If $F(y^i_Q(n)) < F(y^{i-1}_Q(n))$ ('Yes' in block 218), then the stored computed value is updated (block 214) and a further iteration is performed using the solution from the current iteration, $y^i_Q(n)$ as the starting point for the next iteration (as set in block 206). If, however, $F(y^i_Q(n)) \geq F(y^{i-1}_Q(n))$ ('No' in block 218), the process is stopped and the solution from the previous iteration is found to be a solution to the optimization: $x_Q(n) = y^{i-1}_Q(n)$.

The method may be repeated, each time using a different initial searching point $y^0(n)$, as indicated by dotted arrow 20. There may also be an additional stop condition (e.g. within the loop comprising blocks 218, 214, 216 etc) such that the method terminates when additional criteria are met (e.g. a maximum value of i)

Having reached a final solution, the solution may then be stored in a look-up table (block 222), which may be a look-up table in an OFDM transmitter, and the data stored in the table may subsequently be transmitted (block 224).

The method shown in FIG. 2 and described above finds an optimized quantized solution and this may be different from the optimum real number solution.

It will be appreciated that the non-linear least squares optimization described above used the Levenberg-Marquardt search algorithm. This provides just one example of a suitable search algorithm and the method may alternatively use the Trust-Region or the Gauss-Newton search.

The methods described above may be implemented on any OFDM data symbol to be transmitted. In an embodiment, the methods described above may be used to quantize the long training fields (LTF) of an 802.11n OFDM packet. In such an example, the data d(k) is known prior to transmission and the methods described above, and in particular an iterative method as shown in FIG. 2, can be performed offline. The optimized sequence $x_Q(n)$ can then be implemented as a look-up table (LUT). This enables the method to be easily implemented in an OFDM transmitter, by performing the quantization of the LTF offline and storing the result, $x_Q(n)$, in a LUT in the transmitter. The methods may alternatively be implemented for other data elements which are known sufficiently in advance of transmission that the methods described above can be used. In some cases the optimized sequence $x_Q(n)$ may not be stored in a LUT but may be generated on the fly and transmitted once generated.

As described above, the LTF is used by a receiver to make initial estimates on channel and frequency and these estimates are used to demodulate an OFDM packet. The quality of these initial estimates is important in order to achieve good transmitter modulation accuracy and consequently using the methods described herein to improve the LTF improves the transmitter modulation accuracy.

In an example, the Long Training Fields for 20 MHz channel bandwidth high-throughput transmission (HT-LTF) may be optimized using the method shown in FIG. 2 and described above. For equation 5, this means N=64 and the valid tones are k=1, 2, ..., 28, 36, 37, ..., 62, 63 (note that k=32, 33, ..., 62, 63 can be used interchangeably with k=−32, −31, ..., −2, −1. i.e. frequency tone/index 32 is the same as −32, and frequency tone 63 is the same as −1).

Figure 3:
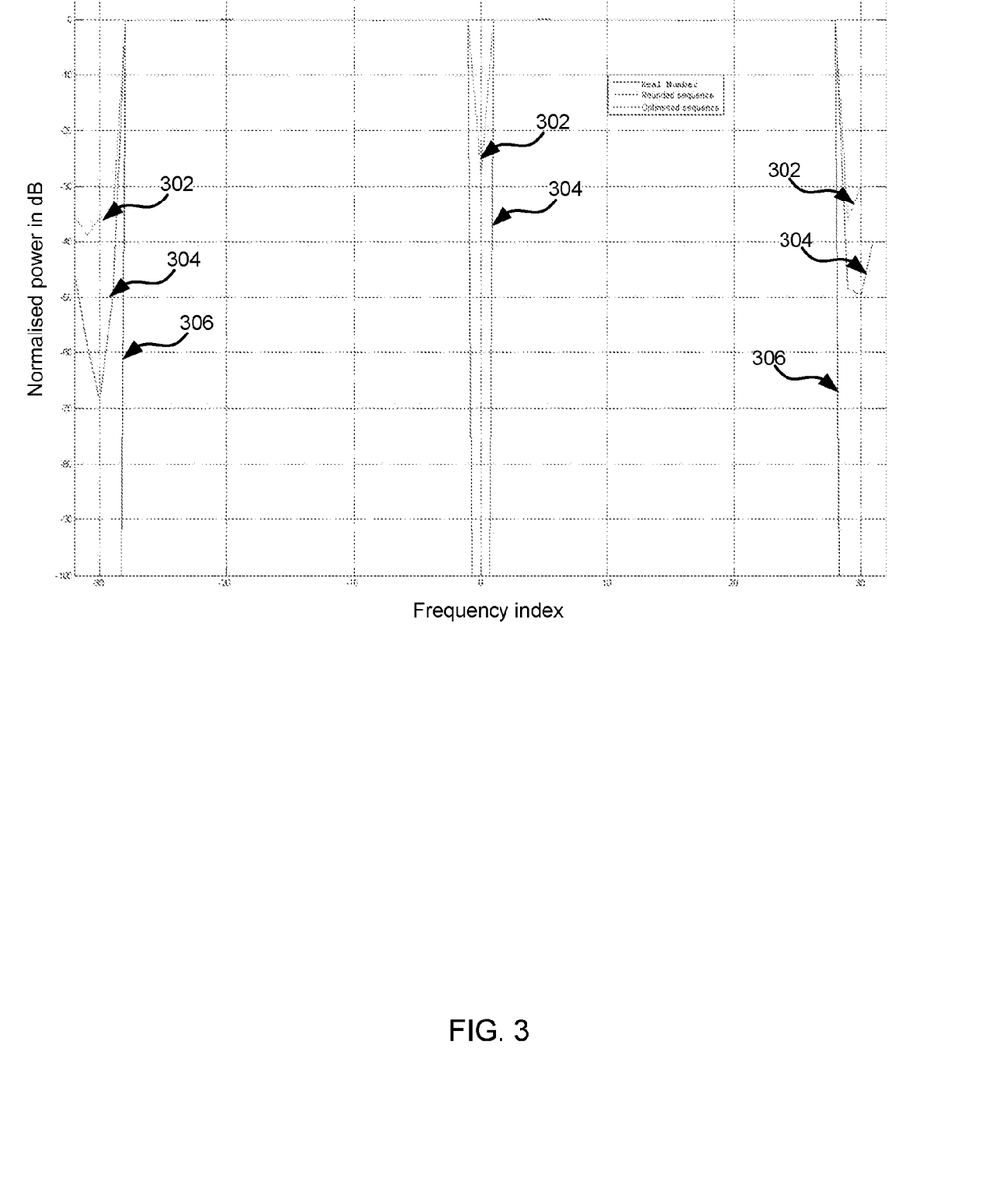
FIGS. 3 and 4 show results obtained using the method shown in FIG. 2.
Figure 4:
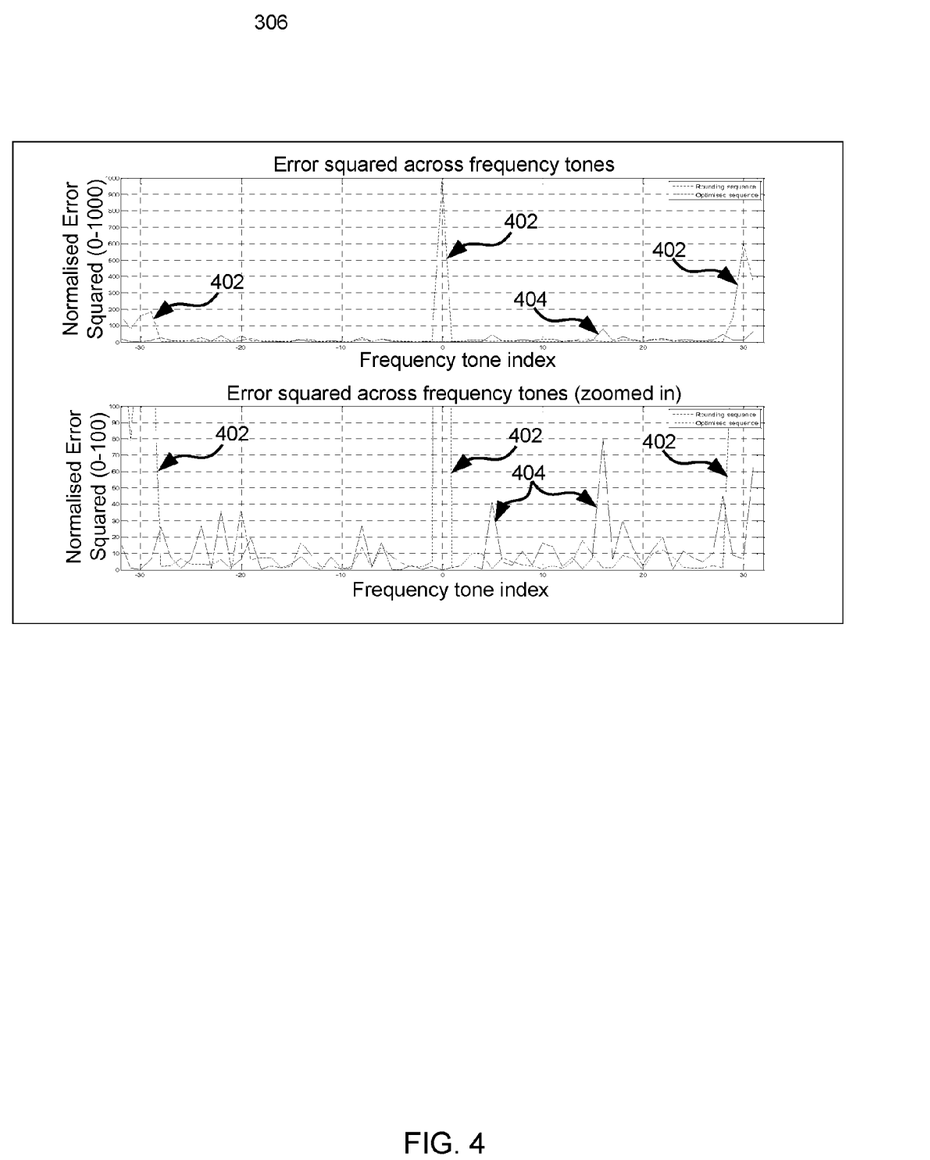

The power spectra of the rounded sequence 304 and the optimized sequence 302 are shown in FIG. 3 and compared with the power spectrum of the real number sequence 306. It can be seen that the optimized sequence has higher power on the dc and edge subcarriers (the unused subcarriers). However it is still greater than 28 dB down from the data tones and the optimized sequence such that it will meet the spectrum mask defined in the standard. The error signal in frequency $|v_k|^2$ is shown in FIG. 4. It can be seen that the optimized sequence error 402 has shifted error onto the dc and edge carriers which do not carry data (compared to the rounded sequence error 404). Testing has shown that an optimized HT-LTF sequence generated using the method shown in FIG. 2 and described above can reduce improve the transmitter accuracy by 3 dB for HT Mixed Format (this result only measured the contribution from 9-bit quantization in the HT-LTF).

Although the examples are described above with reference to a 20 MHz system, the methods are also applicable to 40 MHz systems. The methods may also be applied to other non-WiFi applications of OFDM and to OFDM systems operating under standards other than IEEE 802.11. The methods are also applicable to systems using MIMO (multiple input multiple output), for example, where there is no beamforming applied at the transmitter.

Figure 5:
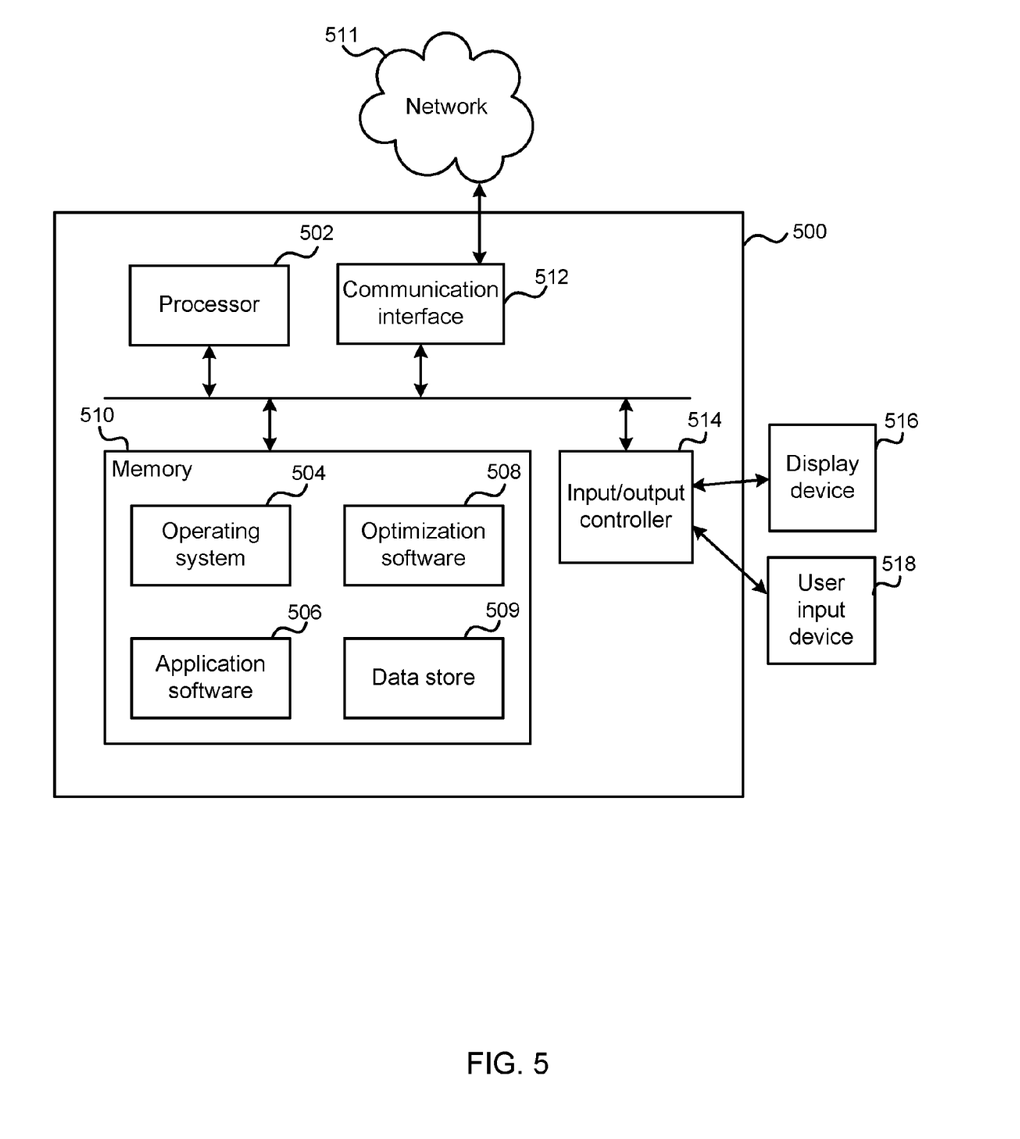
FIG. 5 is a schematic diagram of an exemplary computing-based device in which embodiments of the quantization methods described herein may be implemented.

FIG. 5 illustrates various components of an exemplary computing-based device 500 which may be implemented as any form of a computing and/or electronic device, and in which embodiments of the quantization methods described above may be implemented.

Computing-based device 500 comprises one or more processors 502 which may be microprocessors, controllers or any other suitable type of processors for processing computing executable instructions to control the operation of the device in order to perform quantization using one of the methods described herein. Platform software comprising an operating system 504 or any other suitable platform software may be provided at the computing-based device to enable application software 506, including optimization software 508 to be executed on the device.

The computer executable instructions may be provided using any computer-readable media, such as memory 510. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be used to store the quantized solution or data used in computing the quantized solution (e.g. data store 509). Although the memory is shown within the computing-based device 500 it will be appreciated that the storage may be distributed or located remotely and accessed via a network 511 or other communication link (e.g. using communication interface 512).

The computing-based device 500 may also comprise an input/output controller 514 arranged to output display information to a display device 516 which may be separate from or integral to the computing-based device 500. The display information may provide a graphical user interface. The input/output controller 514 may also be arranged to receive and process input from one or more devices, such as a user input device 518 (e.g. a mouse or a keyboard). In an embodiment the display device 516 may also act as the user input device 518 if it is a touch sensitive display device. The input/output controller 514 may also output data to devices other than the display device, e.g. a locally connected printing device (not shown in FIG. 5).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer implemented method of quantizing an OFDM signal, the method comprising:
   defining an objective function as a function of a quantization error of the OFDM signal in frequency summed over data subcarriers;
   optimizing, by a processor, the objective function using a search algorithm to generate a real number solution; and
   quantizing the real number solution to generate a quantized solution.

2. The method according to claim 1, further comprising:
   storing the quantized solution in a look-up table in an OFDM transmitter.

3. The method according to claim 2, further comprising:
   transmitting the quantized solution from the OFDM transmitter.

4. The method according to claim 1, wherein the OFDM signal comprises long training fields.

5. The method according to claim 1, further comprising:
computing a value of the objective function using the quantized solution; and
for a first iteration and in subsequent iterations if the computed value is less than a value of the objective function computed in a previous iteration, repeating the method using the quantized solution as a starting point for optimizing the objective function.

6. The method according to claim 5, further comprising, in subsequent iterations if the computed value is not less than the value of the objective function computed in the previous iteration:
using the quantized solution from the previous iteration.

7. The method according to claim 1, wherein the data subcarriers comprise payload data subcarriers and pilot subcarriers.

8. The method according to claim 1, wherein the objective function is defined as a square of quantization error in frequency summed over data subcarriers.

9. The method according to claim 8, wherein the objective function is:

$$F(x_Q(n)) = \sum_k |d_Q(k) - d(k)|^2$$

where k is over the data carrying subcarriers, n is the time index, $d(k)=FFT(x(n))$, $x_Q(n)$ is a quantized representation of the time-domain signal $x(n)$ and $d_Q(k)=FFT(x_Q(n))$.

10. The method according to claim 9, wherein the search algorithm comprises a non-linear least squares optimization algorithm.

11. A method of quantizing an OFDM long training field comprising:
defining an objective function as a square of quantization error in frequency summed over data subcarriers;
generating a starting search point;
using a search algorithm and the starting search point to optimize the objective function and compute a solution by a processor;
quantizing the solution and using the quantized solution to compute a value of the objective function;
in a first iteration, storing the computed value and the quantized solution and repeating the optimization and quantization using the stored solution; and
in a subsequent iteration, comparing the computed value to the stored value, and if the computed value is less than the stored value, storing the computed value and the quantized solution and repeating the optimization and quantization using the stored solution, and
if the computed value is not less than the stored value, outputting the stored solution.

12. The method according to claim 11, further comprising repeating the method for each symbol in the OFDM long training field.

13. The method according to claim 12, further comprising storing the output solutions in a look-up table in an OFDM transmitter module.

14. The method according to claim 11, wherein the objective function is defined as a square of quantization error in frequency summed over data subcarriers.

15. The method according to claim 11, wherein the objective function is:

$$F(x_Q(n)) = \sum_k |d_Q(k) - d(k)|^2$$

where k is over the data carrying subcarriers, n is the time index, $d(k)=FFT(x(n))$, $x_Q(n)$ is a quantized representation of the time-domain signal $x(n)$ and $d_Q(k)=FFT(x_Q(n))$.

16. An apparatus for quantizing an OFDM signal, the apparatus comprising:
an input for receiving an OFDM signal;
a processor;
an output for outputting a quantized OFDM signal; and
a memory arranged to store executable instructions which when executed cause the processor to:
optimize an objective function using a search algorithm to generate a real number solution, the objective function comprising a square of quantization error of the OFDM signal in frequency summed over data carrying subcarriers;
round the real number solution to generate a quantized solution; and
store the quantized solution.

17. The apparatus according to claim 16, wherein memory is further arranged to store executable instructions which when executed cause the processor to:
compute a value of the objective function using the quantized solution; and
repeat the method using the quantized solution as a starting point for optimizing the objective function if the computed value is less than a value of the objective function computed in a previous iteration.

18. The apparatus according to claim 17, wherein the memory is further arranged to store executable instructions which when executed cause the processor to:
discard the quantized solution if the computed value is not less than the value of the objective function computed in the previous iteration; and
output the quantized solution from the previous iteration.

19. The apparatus according to claim 16, wherein the objective function is:

$$F(x_Q(n)) = \sum_k |d_Q(k) - d(k)|^2$$

where k is over the data subcarriers, n is the time index, $d(k)=FFT(x(n))$, $x_Q(n)$ is a quantized representation of the time-domain signal $x(n)$ and $d_Q(k)=FFT(x_Q(n))$.

20. The apparatus according to claim 16, wherein the OFDM signal comprises long training fields.

* * * * *